Dec. 8, 1970 N. C. GITTINGER 3,546,593
RECEIVER FOR FREQUENCY MODULATED RADIO-FREQUENCY SIGNALS
Filed May 3, 1967
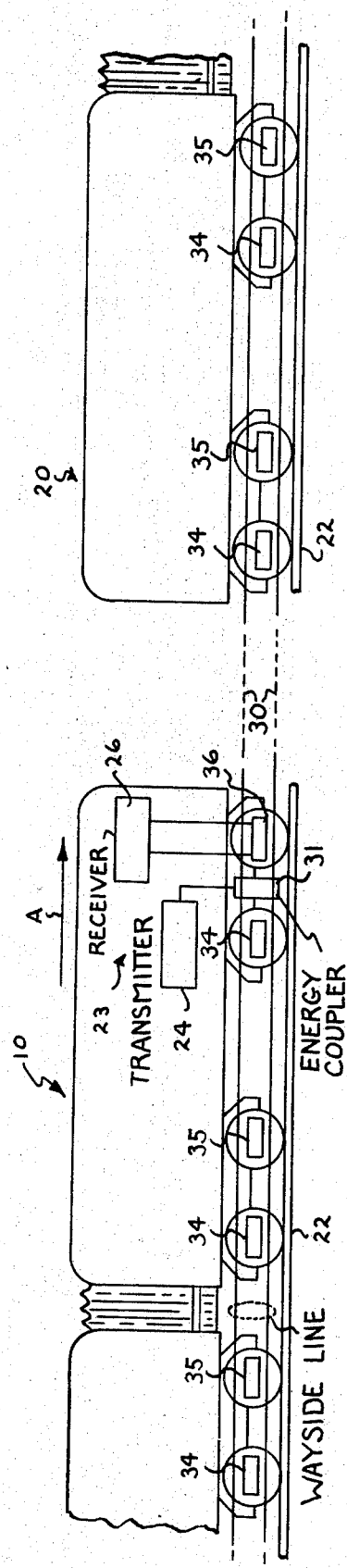
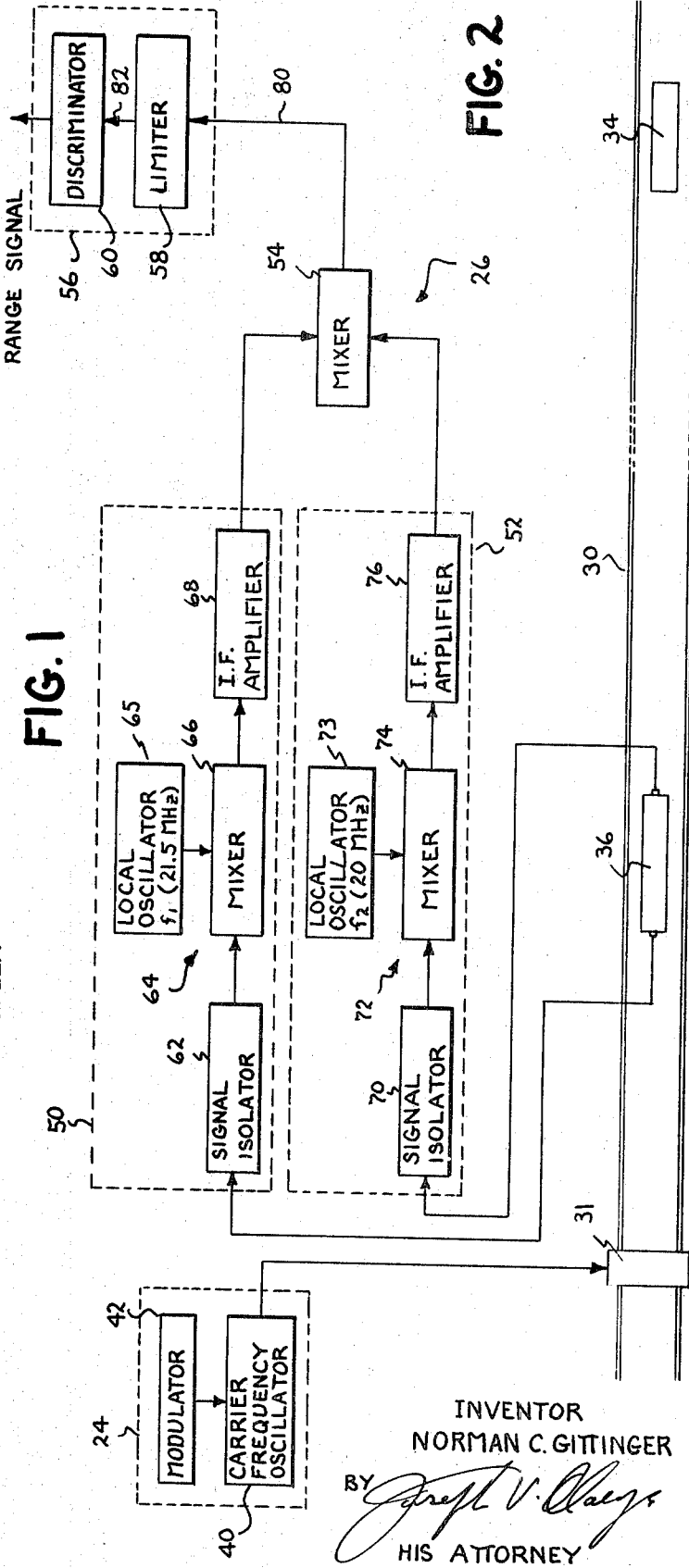
INVENTOR
NORMAN C. GITTINGER
BY
HIS ATTORNEY United States Patent Office 3,546,593
Patented Dec. 8, 1970

3,546,593
RECEIVER FOR FREQUENCY MODULATED RADIO-FREQUENCY SIGNALS
Norman C. Gittinger, Schenectady, N.Y., assignor to General Electric Company, a corporation of New York
Filed May 3, 1967, Ser. No. 635,838
Int. Cl. H04b 1/06, 1/26
U.S. Cl. 325—344                        5 Claims

ABSTRACT OF THE DISCLOSURE

A receiver, for a vehicle separation ranging system of the type employing a wayside transmission line, wherein a signal extracted from transmitted FM energy in the line is converted to a first intermediate frequency signal and a signal extracted from reflected FM energy in the line is converted to a different intermediate frequency signal, which two intermediate frequency signals are then multiplied together in a mixer circuit. The output of the mixer circuit is demodulated to provide a signal which is a direct measure of the distance between the vehicle transmitting the energy in the line and the vehicle from which such energy is reflected.

---

This invention relates to a new and improved receiver for frequency modulated, radio-frequency signals and more particularly, to an arrangement for comparing two frequency modulated, radio-frequency signals which differ only in the phase of the modulation and carrier and providing an output which is a direct measure of the modulation phase difference. The present invention is especially useful in a receiver for use in a ranging system of the guided electromagnetic energy-type for continuously measuring the distance between vehicles proceeding in the same direction along the same route and will be particularly described in that connection.

One widely used system for achieving vehicle distance separation is known as the "block system" wherein the wayside route is divided into fixed, finite signalling zones. Operation of a vehicle is permitted in these zones or "blocks" based on occupancy of the blocks ahead of the vehicle. Many arrangements may be employed depending on the traffic density and headway (time separation between vehicles) desired; the most common arrangement being that referred to as a "three-tier" system of red, yellow and green signal indications. In such an arrangement, the block immediately behind an occupied block is assigned the red, or stop, indication, the next following block the yellow, or proceed at reduced speed, indication, and the third block behind the occupied block assigned the green, or proceed at maximum permissible speed for that block, indication.

It has been recognized that true maximum line performance can be achieved in rapid transit systems and the like, for example, only when a vehicle separation distance detection system is provided having a continuous output. One new and improved system of this type is described in U.S. Pat. No. 3,305,682. In that system, a transmission line extends along and adjacent to the route of travel of the vehicle and frequency modulated, radio-frequency energy is coupled from the vehicle to the line for propagation therein in only one direction. That is, in the direction in advance of the vehicle. A first frequency modulated, radio-frequency signal is then extracted from the transmission line from the transmitted wave energy therein and a second frequency modulated, radio-frequency signal is extracted from the transmission line from reflected wave energy therein. The first and second signals so extracted are then suitably compared in phase to provide an output signal which is a direct measurement of the distance between the vehicle and another vehicle in advance thereof from which the transmitted energy has been reflected.

While the system of the foregoing U.S. Pat. No. 3,305,682 is entirely satisfactory, it is desirable that further development work be carried on to improve the accuracy and reliability of the vehicle separation distance detection system.

It is an object of this invention, therefore, to provide a new and improved receiver for use with a vehicle separation distance detection system of the type using guided electromagnetic energy.

It is another object of this invention to provide a new and improved receiver for comparing two frequency modulated, radio-frequency signals which is amplitude insensitive within a broad range of input signal strengths.

It is a further object of this invention to provide a new and improved receiver for comparing two frequency modulated, radio-frequency signals wherein the phase characteristics of any nonlinear circuits do not affect the accuracy of the receiver output.

Briefly stated, in accordance with one aspect of the invention, a new and improved receiver for a vehicle separation distance detection system includes means for converting a first frequency modulated, radio-frequency signal, extracted from transmitted energy in an adjacent transmission line, into a first intermediate frequency signal. The receiver also includes means for converting a second frequency modulated, radio-frequency signal, extracted from reflected energy in the adjacent transmission line, into a second intermediate frequency signal whose frequency differs from that of the first intermediate frequency signal by a predetermined amount. The receiver further includes means for mixing the first and second intermediate frequency signals to provide an output signal corresponding to the difference frequency between the two intermediate frequency signals. Means are provided to demodulate the difference frequency signal so provided to produce an A-C output signal whose amplitude is a direct measurement of the modulation phase difference—and therefore the time delay difference—between the two frequency modulated, radio-frequency signals extracted from the transmission line. When the energy in the transmission is coupled thereto from one vehicle and reflected by a vehicle in advance thereof, this A-C output signal is a direct measurement of the separation distance between the vehicles.

The novel features believed characteristic of the invention are set forth with particularity in the appended claims. The invention itself, however, together with further objects and advantages thereof, as well as, its organization and method of operation can best be understood by reference to the following description taken in connection with the accompanying drawing in which:

FIG. 1 is an illustration of a ranging system, of the type with which the receiver of this invention may be advantageously employed, for providing a continuous measurement of the distance between two trains proceeding in the same direction along the same track; and FIG. 2 is a block diagram illustrating the elements of one embodiment of this invention.

For convenience and clarity in describing the invention, certain specific terms and values may be used from time to time throughout the following description. These terms, however, are intended to refer only to the arrangement illustrated in the drawing, or other exemplary arrangements, and are not intended to define or limit the scope of the invention.

Referring now to the drawing, FIG. 1 schematically illustrates a ranging system of the guided electromagnetic energy type for use in continuously measuring the distance between two trains 10 and 20 proceeding in the same direction along the track 22. One of the cars, the lead car, of each train 10 and 20 carries a ranging system 23 including a transmitting means 24 and a receiver 26; such apparatus being illustrated for simplicity only on the lead car of train 10. Energy is coupled from the transmitter means 24 through a suitable energy coupler 31 to transmission line 30 which extends along and adjacent to the track 22. To assure propagation of the transmitted wave energy in transmission line 30 in one direction only, train 10 is provided with suitable energy reflecting and absorbing devices 34 and 35, respectively. The input means of receiver 26 is connected to a directional signal extracting means 36 which is disposed in proximity to the transmission line 30 and operates to extract a first signal from such line from the transmitted wave energy therein and a second signal from such line from the reflected energy therein. As shown, the advance train 20 is also provided with suitable energy reflecting and absorbing devices 34 and 35 to cause respectively the reflection of wave energy back toward the source—train 10—and prevent the transmitted energy from train 10 from appearing on the line in advance of train 20.

As shown more specifically in FIG. 2, the system includes a high frequency, stable oscillator 40 for providing a carrier frequency signal which is suitably frequency modulated with a sub-carrier frequency signal in a modulator 42. This frequency modulated, radio-frequency signal is then coupled through energy coupler 31 to the transmission line 30. When this transmitted energy strikes the target, provided by the energy reflecting device 34 carried in proximity to the transmission line 30 by the advance train 20, it is reflected back toward the source so that at the location on the line at which the directional signal extracting means 36 is disposed, a first frequency modulated radio-frequency signal may be extracted from the transmitted wave energy in the line 30 and a second frequency modulated, radio-frequency signal may be extracted from the reflected wave energy in such line.

The signal extracted from the reflected wave energy in the line 30 is a delayed version of the signal extracted from the transmitted wave energy. That is, the two signals are frequency modulated, radio-frequency signals which are identical in all respects except for the phase of the modulation signal. Since the transmitted energy is frequency modulated, the instantaneous frequencies of the two signals will differ by an amount which is proportional to the time delay between them. Since the time delay is a function of the round-trip distance between the vehicles 10 and 20, the instantaneous frequency difference is, therefore, an indication of the vehicle separation distance.

In accordance with this invention, there is provided a new and improved receiver which is operative to detect the instantaneous frequence difference between the two frequency modulated, radio-frequency signals and provide at its output an A-C signal whose amplitude is proportional to the vehicle separation distance.

In accordance with this invention, one of the signals extracted from the transmission line is converted to a convenient intermediate frequency signal and the other signal extracted from the line is converted to a different intermediate frequency signal. The two intermediate frequency signals are arranged to differ from each other by a predetermined amount, for example, 1.5 mHz. The two different intermediate frequency signals so provided are then mixed together to obtain a difference frequency which, when suitably demodulated, will produce an A-C output signal whose amplitude is a direct measure of the time delay difference between the two extracted frequency modulated, radio-frequency signals.

One embodiment of a receiver incorporating this invention is shown in detail in FIG. 2. As shown, the receiver includes two channels 50 and 52 associated respectively with the transmitted and reflected signals extracted from the transmission line 30. Channel 50 is operative to convert the extracted transmitted frequency modulated, radio-frequency signal to a first intermediate frequency signal while channel 52 operates in a similar manner to convert the extracted reflected frequency modulated, radio-frequency signal to a different intermediate frequency signal. The two intermediate frequency signals from the channels 50 and 52 are then mixed in a suitable mixer circuit 54 to provide a difference frequency signal which is suitably demodulated in demodulator means 56, shown as including a limiter 58 and a discriminator 60, which may be of the Foster-Seeley type.

More specifically, each of the channels 50 and 52 includes a signal isolator, a converter and an intermediate frequency amplifier. Thus, channel 50 includes a signal isolator 62, a converter 64 (including a local oscillator 65 and a mixer circuit 66) and an intermediate frequency amplifier 68. Similarly, channel 52 includes a signal isolator 70, which may be a suitable buffer amplifier, a converter 72 (including a local oscillator 73 and a mixer circuit 74) and an intermediate frequency amplifier 76. Suitable selection of the output frequency of the local oscillators 65 and 73 will assure that the intermediate frequency signals produced from the extracted transmitted and reflected signals differ from each other by a preselected amount.

For example, in the receiver illustrated for use with a ranging system employing a carrier frequency of 31 mHz., frequency modulated with an 8 kHz. sine wave at a modulation index of about 2.5, the transmitted signal is converted in channel 50 to an intermediate frequency signal of 9.5 mHz. and the reflected signal is converted in channel 52 to an intermediate frequency signal of 11 mHz.; the difference frequency, therefore, being 1.5 mHz. This is accomplished by providing a local oscillator 65 having an output frequency of 21.5 mHz. and a local oscillator 73 having an output frequency of 20 mHz. Preferably, local oscillators 65 and 73 are crystal controlled.

The two intermediate frequency signals from channels 50 and 52 are then suitably mixed together, such as by being applied to the mixer 54, to obtain the difference frequency which, since the two signals are arranged to differ by some preselected amount, will always by non-zero. The difference frequency output has a frequency modulation frequency deviation which is proportional to a sine function of the difference in time delay of the transmitted and reflected signals. This difference frequency signal, therefore, is a normal frequency modulated signal which can be conveniently demodulated by being passed through a limiter and discriminator. The output of the discriminator is an A-C signal whose amplitude is a direct measure of the time delay difference between the two signals extracted from the transmission line and, hence, is a direct measure of the distance between the trains 10 and 20.

In operation, the signal extracted from the transmitted wave energy in the transmission line 30 is applied to the input of signal isolator 62 of channel 50 and thence to converter 64 where it is converted to an intermediate frequency signal of 9.5 mHz. Similarly, the signal extracted from the reflected wave energy in the transmission line is applied to the input of signal isolator 70 of channel 62 and thence to converter 72 where it is converted to an intermediate frequency signal of 11 mHz. The difference between the two intermediate frequency signals is therefore 1.5 mHz.

The signal isolators 62 and 70 employed in the respective channels 50 and 52 may be arranged to accomplish several functions in addition to the primary function which is to assure a proper termination for directional signal extracting means 36 to assure the proper operation thereof. For example, if a proper termination were not provided, the reflected signal, for example, might contain as much transmitted signal as reflected signal. The signal isolator may conveniently provide this function by suitably matching the nominal transmission line impedance to the exactly required amount. This may be accomplished in any suitable manner, such as, for example, by providing the input of the isolator with a broadly tuned series resonant circuit (with a variable inductance) followed by a shunt resistance to ground which is adjustable over a preselected range. For example, where the nominal impedance of the transmission line is 50 ohms, a shunt resistance variable between 25 and 75 ohms is sufficient to provide matching to the exactly required value.

If desired, the signal isolator may be arranged to provide a second function—isolation of the input from the circuits which follow to prevent leakage of unwanted signals from one channel to the other and to permit tuning of the circuits without affecting the input impedance match. The isolator may also be arranged, if desired, to act as a broad filter to reject unwanted out-of-band noise.

Suitable gain for the 9.5 mHz. and 11 mHz. intermediate frequency signals from converters 64 and 72 is provided by tuned intermediate frequency amplifiers 68 and 76. Preferably, amplifiers 68 and 76 employ two stages, in each of which stages there is provided a double-tuned, critically coupled filter. The use of such double-tuned circuits permits the band-pass response to be adjusted for maximum flatness through the pass-band, with relatively steep skirts and good out-of-band rejection. Conveniently, in one particular system, amplifiers 68 and 76 were arranged to have a total bandpass of approximately 500 kHz.

The signals from amplifiers 68 and 76 are then mixed together in mixer circuit 54, the output of which is centered at the 1.5 mHz. difference frequency. Conveniently, mixer circuit 54 may include a single 1.5 mHz. filter whose bandwidth is approximately 200 kHz. If the signals extracted from the transmitted and reflected wave energy in the transmission line are identical in all respects—no time delay between them—then the instantaneous frequency difference between the two intermediate frequency signals from amplifiers 68 and 76 is always 1.5 mHz. so that the output of mixer circuit 54 will be a 1.5 mHz. continuous wave (CW) signal with no frequency modulation. For example, the signals from amplifiers 68 and 76 will always change frequency in synchronism and, since the frequency difference between them is constant, the output frequency of mixer circuit 54 is also constant.

The output of mixer circuit 54 is then fed by line 80 to the input of limiter circuit 58 which repeatedly amplifies and limits the signal to remove amplitude fluctuations and provide a constant level signal at its output. The output of limiter circuit 58 is applied by line 82 to the input of discriminator 60, which may be of the Foster-Seeley type, which detects any frequency modulation present on the 1.5 mHz. limited signal. To enchance the purity of the range signal, an 8 kHz. bandpass filter may by provided following the discriminator 60 to reject any residual unwanted noise.

From the foregoing description, it will be seen that the comparison of the two extracted signals is accomplished at radio-frequency and before the extracted signals have been passed through non-linear limiter stages and frequency modulation detectors. Also, parallel channel circuitry is limited to amplitude insensitive stages so that problems of maintaining equal time delay in both channels are minimized. Moreover, the arrangement is entirely ampltiude insensitive within a broad range of input signal strengths. Since non-linear (amplitude sensitive) circuits act on the signal only after the comparison has been made, the phase characteristics of such non-linear circuits are not a factor in the accuracy of the measurement of the time delay difference in the two extracted signals.

It will be apparent to those skilled in the art that the illustrated embodiment of the invention is an example only and that many changes and modifications may be made without departing from the invention. It is intended, therefore, in the appended claims to cover all such changes and modifications as fall within the true spirit and scope of the invention.

What I claim as new and desire to secure by Letters Patent of the United States is:

1. In a receiver for use with a vehicle separation distance detection system of the type wherein a transmission line extends along and adjacent to the route of travel of said vehicle and wherein frequency modulated energy is coupled to and propagated in only one direction in said transmission line and a first frequency modulated signal is extracted from said transmission line from the transmitted wave energy therein and a second frequency modulated signal is extracted from said transmission line from the reflected wave energy therein, the combination comprising:
   (a) means for converting said first frequency modulated signal to a first intermediate frequency signal, the frequency of which differs from that of said first frequency modulated signal by a first constant and predetermined amount;
   (b) means for converting said second frequency modulated signal to a second intermediate frequency signal the frequency of which differs from that of said second frequency modulated signal by a second constant and predetermined amount and differs from said first intermediate frequency signal by a predetermined amount;
   (c) mixer circuit means responsive to said first and second intermediate frequency signals for providing a frequency modulated output signal corresponding to the difference frequency thereof; and
   (d) means for demodulating said frequency modulated signal from the output of said mixer circuit means operative to produce an A-C output signal whose amplitude is representative of the time delay difference between said first and second frequency modulated signals extracted from said transmission line.

2. In combination with a vehicle separation distance detecting system of the type wherein first and second frequency modulated signals are extracted from a transmission line extending along and adjacent to the route of travel of said vehicle and wherein said first signal is obtained from transmitted wave energy in said transmission line and said second signal is obtained from reflected wave energy therein, a receiver comprising in combination:
   (a) first and second local oscillator circuits the outputs of which differ in frequency by a preselected amount;
   (b) first mixer circuit means responsive to said first signal extracted from said transmission line and the output of said first local oscillator circuit for converting said first signal to a first intermediate frequency signal;
   (c) second mixer circuit means responsive to said second signal extracted from said transmission line and the output of said second local oscillator circuit for converting said second signal to a second intermediate frequency signal which differs in frequency from said first intermediate frequency signal by a predetermined amount;
   (d) a third mixer circuit responsive to said first and second intermediate frequency signals operative to provide therefrom a frequency modulated signal, the frequency deviation of which is proportional to the sine function of the difference in time delay between said first and second signals extracted from said transmission line; and
   (e) means for demodulating said frequency modulated output signal from said third mixer circuit for producing an A-C signal whose amplitude is representative of the time delay difference between said first and second signals extracted from said transmission line.

3. In a receiver means responsive to first and second radio-frequency, frequency modulated signals which are identical in all respects except phase and being operative to develop an output representative of a distance to a target, the combination comprising:
(a) first mixer means for converting said first frequency modulated signal to a first intermediate frequency signal;
(b) second mixer means for converting said second frequency modulated signal to a second intermediate frequency signal which differs from said first intermediate frequency signal by a predetermined amount;
(c) means responsive to said first and second intermediate frequency signals for providing an output signal representing the difference therebetween, said output signal being a frequency modulated signal the frequency deviation of which is proportional to the sine function of the difference in time delay between said first and second frequency modulated signals; and
(d) means for demodulating said output signal to produce an A-C signal the amplitude of which represents the time delay difference between said first and second signal.

4. In a receiver responsive to first and second frequency modulated, radio-frequency signals extracted respectively from transmitted and reflected wave energy in a transmission line, the combination comprising:
(a) first and second signal channels responsive respectively to said first and second frequency modulated, radio-frequency signals for producing therefrom first and second intermediate frequency signals which differ in frequency from each other by a preselected amount, each of said signal channels including a signal isolator, a mixer circuit in cascade with said signal isolator, a local oscillator the output of which is applied to said mixer circuit and an intermediate frequency amplifier in cascade with said mixer circuit;
(b) a mixer circuit means having first and second input means and an output means;
(c) means adapted to apply said first and second intermediate frequency signals to the first and second input means respectively of said mixer circuit means;
(d) a limiter circuit means having an input means and an output means;
(e) means adapted to couple the output means of said mixer circuit means to the input means of said limiter circuit means;
(f) a discriminator circuit having input means and output means; and
(g) means for coupling the output means of said limiter circuit means to the input means of said discriminator circuit.

5. A method of comparing two frequency modulated, radio-frequency signals to provide an output signal which is an accurate measure of any time delay therebetween comprising:
(a) converting one of said frequency modulated, radio-frequency signals to a first intermediate frequency signal and the other frequency modulated, radio-frequency signal to a second intermediate frequency signal which differs in frequency from said first intermediate frequency signal by a preselected amount;
(b) obtaining the instantaneous difference frequency between said first and second intermediate frequency signals; and
(c) demodulating said instantaneous difference frequency to detect any frequency modulation present thereon.

References Cited

UNITED STATES PATENTS

| | | | |
|---|---|---|---|
| 3,120,569 | 2/1964 | Wells et al. | 343—14 |
| 3,305,682 | 2/1967 | Bolster et al. | 343—14 |
| 3,383,599 | 5/1968 | Miyagi | 325—419 |
| 3,420,572 | 1/1969 | Bisland. | |

ROBERT L. RICHARDSON, Primary Examiner

ALBERT J. MAYER, Assistant Examiner

325—435; 329—110; 246—30